(12) United States Patent
Kadoche

(10) Patent No.: US 12,102,856 B2
(45) Date of Patent: Oct. 1, 2024

(54) VALVE FOR A FIREFIGHTING INSTALLATION, AND INSTALLATION THEREOF

(71) Applicant: EXEC, Goussainville (FR)

(72) Inventor: Maurice Kadoche, Coubron (FR)

(73) Assignee: EXEC, Goussainville (FR)

( * ) Notice: Subject to any disclaimer, the term of this patent is extended or adjusted under 35 U.S.C. 154(b) by 847 days.

(21) Appl. No.: 17/275,861

(22) PCT Filed: Aug. 6, 2019

(86) PCT No.: PCT/FR2019/051905
§ 371 (c)(1),
(2) Date: Mar. 12, 2021

(87) PCT Pub. No.: WO2020/053494
PCT Pub. Date: Mar. 19, 2020

(65) Prior Publication Data
US 2021/0283443 A1    Sep. 16, 2021

(30) Foreign Application Priority Data

Sep. 14, 2018   (FR) ...................................... 1858317

(51) Int. Cl.
*A62C 35/62*      (2006.01)
*A62C 35/68*      (2006.01)
*F16K 17/30*      (2006.01)

(52) U.S. Cl.
CPC .............. *A62C 35/62* (2013.01); *A62C 35/68* (2013.01); *F16K 17/30* (2013.01)

(58) Field of Classification Search
CPC .......... A62C 35/62; A62C 35/68; F16K 17/30

USPC ......................................... 169/16, 17, 19, 20
See application file for complete search history.

(56) References Cited

U.S. PATENT DOCUMENTS

2012/0292057 A1    11/2012   Schlatter

FOREIGN PATENT DOCUMENTS

| FR | 3002153 A1 | 8/2014 |
| JP | 2006017302 A | 1/2006 |
| JP | 2012213464 A | 11/2012 |
| JP | 2016059648 A | 4/2016 |
| KR | 20040088444 A | 10/2004 |

(Continued)

OTHER PUBLICATIONS

English translation of the Written Opinion of the International Searching Authority dated Oct. 25, 2019 for corresponding International Application No. PCT/FR2019/051905, filed Aug. 6, 2019.

(Continued)

*Primary Examiner* — Christopher S Kim
(74) *Attorney, Agent, or Firm* — David D. Brush; Westman, Champlin & Koehler, P.A.

(57) ABSTRACT

A firefighting installation including a valve and a network kept under vacuum in a standby position and flooded with water by an actuator if the installation is triggered in the event of a fire. The valve includes: a first conduit to be coupled with the vacuum network which includes the actuator; a second conduit to be coupled with a control device adapted to trigger the actuator by the effect of an air intake; a third conduit to be coupled to a sprayer; a shutter movable by the effect of a water pressure; and an elastically-deformable element adapted to hold the shutter in a rest position.

10 Claims, 4 Drawing Sheets

(56) References Cited

FOREIGN PATENT DOCUMENTS

WO    2010148005 A1    12/2010

OTHER PUBLICATIONS

International Search Report dated Oct. 16, 2019 for corresponding International Application No. PCT/FR2019/051905, Aug. 6, 2019.
Written Opinion of the International Searching Authority dated Oct. 16, 2019 for corresponding International Application No. PCT/FR2019/051905, filed Aug. 6, 2019.

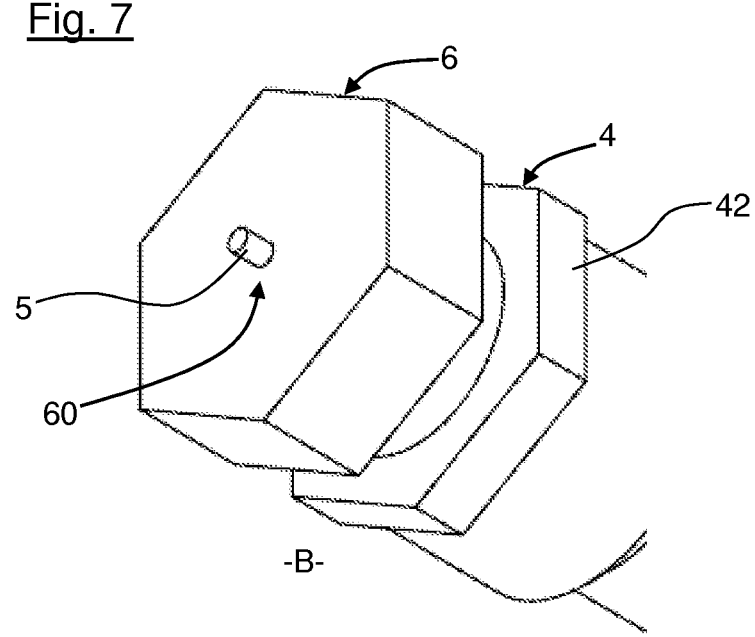
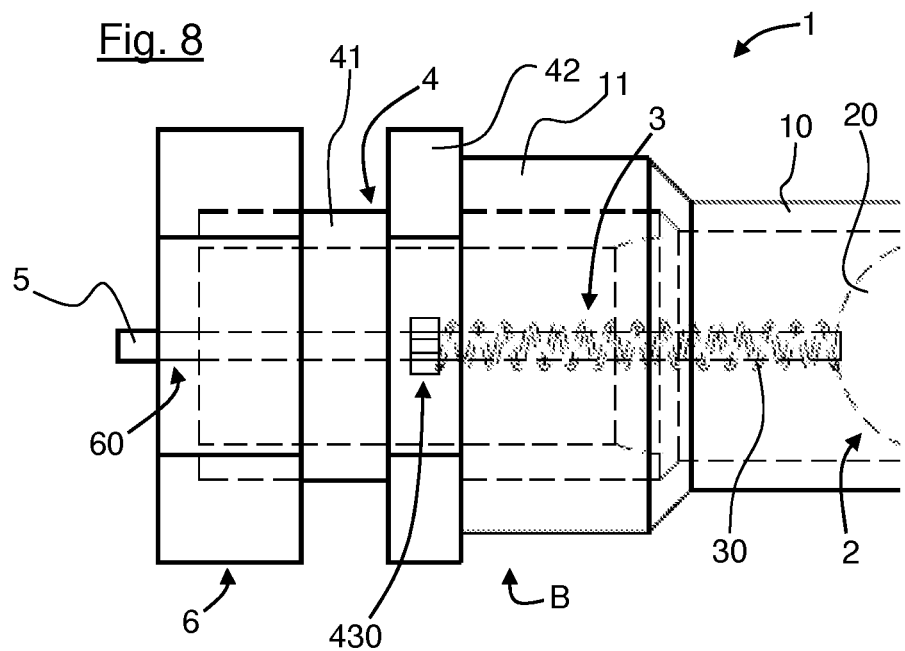

VALVE FOR A FIREFIGHTING INSTALLATION, AND INSTALLATION THEREOF

CROSS-REFERENCE TO RELATED APPLICATIONS

This Application is a Section 371 National Stage Application of International Application No. PCT/FR2019/051905, filed Aug. 6, 2019, the content of which is incorporated herein by reference in its entirety, and published as WO 2020/053494 on Mar. 19, 2020, not in English.

FIELD OF THE DISCLOSURE

The field of the invention relates to the design and manufacture of firefighting equipment and installations.

More specifically, the invention concerns so-called "vacuum" firefighting installations.

BACKGROUND OF THE DISCLOSURE

The role of an automatic fire extinction installation implementing sprinklers is to detect, as soon as possible, a fire source and then automatically trigger the extinction system, at least locally, while emitting an alarm. The installation aims at containing most of the fire, before the arrival of firefighters who then take over the installation to extinguish the fire.

In the field of the invention, firefighting installations are classified into three categories, namely:
 "water" systems;
 "air" systems;
 "vacuum" systems.

In these three systems, the sprinklers are mounted in a network so as to be evenly distributed over the site to be protected. Conventionally, the sprinklers comprise:
 a fastening connector, allowing linking the sprinkler to a piping, this fastening connector having a conduit intended for the passage of water to be released to extinguish the fire;
 a fuse;
 a cap for shutting off the conduit, held in the shutoff position by the fuse.

The fuse is calibrated so as to burst when a determined temperature is exceeded, thereby releasing the conduit from the connector.

In "water" systems, the entire piping of the installation is filled with water, up to the sprinklers. Hence, water is waiting behind the shutoff means and when the fuse bursts, water flows throughout the conduit of the connector of the sprinkler whose fuse has burst.

Hence, the water release time is immediate which is particularly advantageous. In contrast, "water" systems are not suited for sites with icing risks. Indeed, in the event of icing, water cannot flow. In addition, icing might cause deteriorations to the piping of the installation (deformation and even break-up of the hoses). In some cases, the installation is then cleared of water. In other cases, the site to be protected is heated to avoid any risk of icing. For sites to be protected having a relatively wide area, the energy consumption, and consequently the heating cost, may turn out to be considerable, and even prohibitive. Another way to fight icing is to add an anti-freeze to the water of the installation, such as glycol which is a toxic and carcinogenic product.

In "air" systems, the entire installation is free of water. The entire piping of the installation is maintained under pressure. When the fuses burst, the air pressure is released through the considered sprinkler(s) and water, also under pressure, tends to "push" air out of the installation until reaching the cleared orifice(s) so as to escape through the latter.

With such a system, water can, in some cases, take up to 60 seconds to reach the sprinkler whose fuse has burst, which while being compliant with the standard in force might turn out to be too long with regards to some fire outbreaks.

Furthermore, "air" systems are not completely free of icing-related problems. Indeed, condensate may be created in the piping of an «air» installation, which might affect some components of the installation.

In general, "water" and "air" systems have the following drawbacks:
 they are subject to plugging and, consequently, to clogging;
 they are subject to corrosion, which may of course lead to an installation that is totally or partially out of order;
 they may be subject to non-visible water leakages;
 they allow the development of microorganisms in the pipes of the installation.

The result is that they need, amongst others, anti-freeze and anti-corrosion treatments.

Moreover, they require rinsing operations after use.

Furthermore, they involve relatively long start-up times, depending on the extent of the installation, which may range from one hour to four hours for "water" systems and two hours and more for "air" systems.

To overcome all of these drawbacks, "vacuum" systems have been designed. In "vacuum" systems, a vacuum is created in the pipes extending between a general valve (closed by default) and the set of sprinklers. In other words, all pipes separating the valve from the sprinklers are under vacuum.

If a fuse of one of the sprinklers bursts, the atmospheric pressure spreads to the entire installation, which causes a change of the state of an actuator which, in turn, opens the water supply general valve. This results in water overwhelming the entire installation up to the sprinklers, water flowing through the sprinkler(s) whose fuse has burst.

The trigger time of the actuator is very short, to the extent that, when a fuse bursts, the "vacuum" installation immediately gives rise to a phenomenon of suction of the air outside the installation. It should be noted that this suction might be beneficial, the effect of suction on the source of fire tending to reduce the intensity of the latter.

The time for water to arrive at the sprinkle whose fuse has burst is shorter than 60 seconds.

Hence, it is understood that, by the absence of water or condensate in an installation of a "vacuum" system, the following results are obtained:
 no corrosion, and therefore no plugging or clogging;
 no development of microorganisms;
 no possible water leakages (water being absent by default in the pipes of the installation leading to the sprinklers);
 no need for any anti-freeze or anti-corrosion treatment;
 no rinsing is necessary before start-up of the installation.

Furthermore, the start-up time of an installation with a "vacuum" system is carried very quickly, within one minute or so.

Parallel to the sprinklers, there are also sprinkling devices of the sprayer type, such as for example a "deluge" head, producing a very strong water sprinkling or an outlet producing a water mist. A "deluge" head operates in open-circuit, that is to say the piping reaching the sprayer is at atmospheric pressure. A water mist sprayer operates in closed-circuit, using a fuse in the same way as a sprinkler, but is provided with a sprinkling opening having a diameter smaller than that of a sprinkler.

Unlike sprinklers and because they are in an open-circuit or because they are not provided with an opening as large as that of a sprinkler, these sprayers are not suitable for the previously-described "vacuum" systems.

Indeed, vacuum cannot be drawn in deluge heads and, if the fuse of a water mist outlet bursts, the air intake in the network would be so small because of the diameter of the sprinkling opening that the actuator would consider the air intake as resulting from a seal leakage of the network rather than the burst of the fuse of one of the sprinkling devices. Yet, vacuum installations are calibrated so as not to trigger the flooding of the network with water if it is considered that the air intake corresponds to that of a leakage. Nevertheless, installations may benefit from using different types of sprinklers and sprayers.

In the field of the invention, there is known the French patent published under the number 3 002 153 which provides a one-way valve allowing associating a sprinkler and an open sprayer.

This valve comprises a shutter movable between a position in which it allows keeping the main network located upstream under vacuum, and a position in which it enables the supply of the sprayer located downstream with water. In particular, the shutter is provided with a sealing gasket which comes into contact with a bearing surface to tightly shut off the conduit communicating with the main network.

This valve effectively fills its function to isolate a portion of the vacuum network from a portion at atmospheric pressure, and allows supplying sprayers with water following triggering of a sprinkler.

Nevertheless, practice has shown that the sealing gasket does not have a satisfactory longevity.

In addition, the one-way valve does not allow making all possible configurations of vacuum networks using water sprinkling devices of different technologies.

Amongst others, in some installations, it could then be necessary to have two networks of pipes:
- a first network comprising water sprinkling devices provided with fuses calibrated at 68° C., and adapted to be flooded with water thanks to an actuator;
- a second network which would comprise at least one sprinkler provided with a fuse calibrated at 57° C. adapted to trigger the actuator by the effect of an air intake.

In this configuration and according to an example of application, at 57° C. the sprinkler can trigger an air intake in the second network. The second network is then overwhelmed with water and, as soon as a temperature of 68° C. is reached in the proximity of the sprinkling devices, they are then able to directly sprinkle water.

This configuration requires two networks, but allows avoiding spraying water as of the burst of the fuse of the sprinkler of the first network.

SUMMARY

It is an objective of the invention to overcome the drawbacks of the prior art.

More specifically, it is an objective of the invention to provide a member allowing using different technologies of sprinkling devices on the same vacuum network of a firefighting installation.

It is also an objective of the invention to provide such a member that allows flooding the network of the installation with water without the water being spread as of flooding with water.

It is a further objective of the invention to provide such a member that has a better longevity than valves of the prior art that comprise a sealing gasket.

These objectives, as well as others that will appear later on, are achieved thanks to the invention whose object is a firefighting installation, including a network of sprinklers kept under vacuum in a standby position and flooded with water by an actuator if the installation is triggered in the event of a fire, characterized in that it comprises at least one valve according to any one of the preceding claims, the first conduit of the valve being coupled with the vacuum network which comprises the actuator, and the second conduit being coupled with a control device adapted to trigger the actuator by the effect of an air intake at the level of the control device.

More specifically, in this installation, the valve comprises:
- a first conduit coupled with the vacuum network which comprises the actuator;
- a second conduit opposite the first conduit and coupled with a control device adapted to trigger the actuator by the effect of an air intake at the level of the control device;
- a third conduit coupled to a sprinkling device and communicating with the first conduit and the second conduit;
- a shutter movable by the effect of a water pressure;
- elastically-deformable means adapted to hold the shutter in a rest position;

the shutter being movable between at least:
- the rest position in which the first conduit, the second conduit and the third conduit communicate with one another;
- a closure position in which the second conduit is shut off and in which the first conduit and the third conduit communicate with one another, and, in the rest position of the shutter, the valve has at least:
- a first passage between the first conduit and the third conduit;
- a second passage between the second conduit and the third conduit;
- the first passage and the second passage being formed between the shutter and a central body of the valve.

Thanks to the valve, the firefighting installation according to the invention can benefit on its vacuum network from a valve with three conduits which enables the set-up of a control device, such as a sprinkler called "control sprinkle". This control sprinkler allows flooding with water the network that is initially under vacuum of the installation, while avoiding triggering a water sprinkling at the level of the control device.

According to a particular use of the installation and of the valve according to the invention, the control sprinkler coupled to the valve on its second conduit is then configured so that its fuse is triggered at a temperature lower than that of sprinkling devices coupled on the third conduit. In this manner, as soon as the control sprinkler is primed, it creates an air intake in the network which is detected by the actuator. Water overwhelms the network and pushes the shutter back in its position of closure of the conduit of the control sprinkler.

This configuration allows isolating the control sprinkler and flooding with water the sprinkling device(s) coupled to the third conduit, in other words, flooding with water the rest of the network extending from the third conduit without spreading water at the level of the control sprinkler.

Thanks to the invention, firefighting installations can thus group together detection and spray functions within the same network which would have been positioned on two different networks in installations according to the prior art.

According to another use of the valve and of the installation according to the invention, this may for example be associated to a control sprinkler on a network comprising sprinkling devices of the water mist sprayer type.

As explained before, water mist sprayers cannot trigger an actuator since, because of their small inner diameter, they cannot generate a pressure variation in the network that would be likened to a fire by the actuator. Indeed, the pressure variation would be likened to a pressure leakage. Consequently, a second so-called "detection" network would conventionally be likened to this first network to trigger a flooding of the first network with water while fostering spraying of water by the sprayers, the conduit of the control sprinkler(s) being shut off.

As explained before, such an installation allows flooding with water the network that is initially under vacuum without water spreading throughout the control device (the control sprinkler) that has created the air intake.

In this case and according to an example of application, the control device is set so as to create an air intake at a temperature well below that at which the other sprinkling devices coupled to the third conduit of the valve will trigger to spread water on the installation site.

According to a preferred embodiment of the invention, the second conduit has an annular stop against which the shutter comes into annular contact in its closure position so as to obtain a tight shutoff of the second conduit.

In this manner, a tight shutoff can be reliably achieved.

Advantageously, the first conduit has an annular stop identical to that of the second conduit.

Thus, in the installation, the valve features a functional symmetry between its first conduit and its second conduit, and the installer can indifferently use either one of these conduits and has only to adapt the position of the implantation of the shutter and of the elastically-deformable means.

According to a preferred variant of the invention:
the shutter is a ball;
the annular stop of the second conduit is shaped like a concave cap having a shape complementary to the ball and with a hole in its center.

Such a combination allows getting rid of a sealing gasket. The ball-annular stop combination has a longer service life than a sealing gasket, and ensures the proper achievement of a tight shutoff of the second conduit in the closure position of the shutter.

According to an advantageous solution, the elastically-deformable means comprise a spring, and each of the first conduit and the second conduit has means for receiving the spring.

The use of springs forms a solution that is easy and quick to implement by an installer who shall assemble the valves on the installation site.

Of course, the springs shall be calibrated specifically to present an elastic deformation compliant with the expected behavior of the shutter.

Preferably, the shutter is fastened to a rod slidably mounted inside the valve according to a direction linking the first conduit and the second conduit, the spring surrounding a portion of the rod.

In this manner, the positions of the shutter may be reached accurately and the water and air streams act on the shutter in a manner controlled and predetermined by the installer For example, the air streams around the ball, when the latter is in its rest position, may be provided so as not to be too limited by the mere presence of the ball.

According to a preferred embodiment of the invention, the means for receiving the spring comprise, for each of the first conduit and the second conduit, an arm extending inside said conduit, the arm having a journal throughout which the rod is sliding.

Thus, sliding of the rod inside the valve is enabled thanks to a robust and reliable mechanism.

According to a preferred solution, the valve comprises:
a central body;
two connectors complementary to the central body to form the first conduit and the second conduit.

Thus, the manufacture of the valve may be done more easily by simplifying the shape of the central body, and by transposing the most complex features to be produced onto the connectors.

According to an advantageous feature, the connectors have the annular stops.

Thus, the connectors keep the shutter trapped within the central body.

Preferably, the arms are located in the connectors.

The assembly of the valve and in particular the positioning of the rod and the ball are then simplified. In addition, making of these arms in the connectors rather than in the central body is easier and less expensive.

It is also an object of the invention a valve for a firefighting installation, the installation including a network of sprinklers kept under vacuum in a standby position and flooded with water by an actuator if the installation is triggered in the event of a fire, the valve comprising:
a first conduit coupled with the vacuum network which comprises the actuator;
a second conduit opposite the first conduit and intended to be coupled with a control device adapted to trigger the actuator by the effect of an air intake at the level of the control device;
a shutter movable by the effect of a water pressure;
elastically-deformable means adapted to hold the shutter in a rest position.

This valve is characterized according to the invention in that it comprises a third conduit intended to be coupled to a sprinkling device and communicating with the first conduit and the second conduit, and in that the shutter is movable between at least:
the rest position in which the first conduit, the second conduit and the third conduit communicate with one another;
a closure position in which the second conduit is shut off and in which the first conduit and the third conduit communicate with one another, Thanks to the valve according to the invention, the firefighting installation can benefit on its vacuum network from a valve with three conduits which enables the set-up of a control device, such as a sprinkler called "control sprinkle". This control sprinkler allows flooding with water the network that is initially under vacuum of the installation, while avoiding triggering a water sprinkling at the level of the control device.

According to a particular use of the valve according to the invention, the control sprinkler coupled to the valve on its second conduit is then configured so that its fuse is triggered at a temperature lower than that of sprinkling devices coupled on the third conduit. In this manner, as soon as the control sprinkler is primed, it creates an air intake in the network which is detected by the actuator. Water overwhelms the network and pushes the shutter back in its position of closure of the conduit of the control sprinkler.

This configuration allows isolating the control sprinkler and flooding with water the sprinkling device(s) coupled to the third conduit, in other words, flooding with water the rest of the network extending from the third conduit without spreading water at the level of the control sprinkler.

Thanks to the invention, firefighting installations can thus group together detection and spray functions within the same network which would have been positioned on two different networks in installations according to the prior art.

According to another use of the valve according to the invention, the latter may for example be associated to a control sprinkler on a network comprising sprinkling devices of the water mist sprayer type.

As explained before, water mist sprayers cannot trigger an actuator since, because of their small inner diameter, they cannot generate a pressure variation in the network that would be likened to a fire by the actuator. Indeed, the pressure variation would be likened to a pressure leakage. Consequently, a second so-called "detection" network would conventionally be likened to this first network to trigger a flooding of the first network with water while fostering spraying of water by the sprayers, the conduit of the control sprinkler(s) being shut off.

According to a preferred embodiment of the invention, the second conduit has an annular stop against which the shutter comes into annular contact in its closure position so as to obtain a tight shutoff of the second conduit.

In this manner, a tight shutoff can be reliably achieved.

Advantageously, the first conduit has an annular stop identical to that of the second conduit.

Thus, the valve according to the invention features a functional symmetry between its first conduit and its second conduit, and the installer can indifferently use either one of these conduits and has only to adapt the position of the implantation of the shutter and of the elastically-deformable means.

According to a preferred variant of the invention:
  the shutter is a ball;
  the annular stop of the second conduit is shaped like a concave cap having a shape complementary to the ball and with a hole in its center.

Such a combination allows getting rid of a sealing gasket. The ball-annular stop combination has a longer service life than a sealing gasket, and ensures the proper achievement of a tight shutoff of the second conduit in the closure position of the shutter.

According to an advantageous solution, the elastically-deformable means comprise a spring, and each of the first conduit and the second conduit has means for receiving the spring.

The use of springs forms a solution that is easy and quick to implement by an installer who shall assemble the valves on the installation site.

Of course, the springs shall be calibrated specifically to present an elastic deformation compliant with the expected behavior of the shutter.

Preferably, the shutter is fastened to a rod slidably mounted inside the valve according to a direction linking the first conduit and the second conduit, the spring surrounding a portion of the rod.

In this manner, the positions of the shutter may be reached accurately and the water and air streams act on the shutter in a manner controlled and predetermined by the installer For example, the air streams around the ball, when the latter is in its rest position, may be provided so as not to be too limited by the mere presence of the ball.

According to a preferred embodiment of the invention, the means for receiving the spring comprise, for each of the first conduit and the second conduit, an arm extending inside said conduit, the arm having a journal throughout which the rod is sliding.

Thus, sliding of the rod inside the valve is enabled thanks to a robust and reliable mechanism.

According to an advantageous feature, the valve comprises a hood coupled on the first conduit or on the second conduit, the hood having a central opening throughout which the rod projects from the valve.

Such a hood allows transforming the valve into a one-way valve, for example to isolate a portion of the upstream network which would be under vacuum and a portion of the downstream network which would be at atmospheric pressure. Of course, the position and the action of the elastically-deformable means shall be adapted.

According to a preferred solution, the valve comprises:
  a central body;
  two connectors complementary to the central body to form the first conduit and the second conduit.

Thus, the manufacture of the valve may be done more easily by simplifying the shape of the central body, and by transposing the most complex features to be produced onto the connectors.

According to an advantageous feature, the connectors have the annular stops.

Thus, the connectors keep the shutter trapped within the central body.

Preferably, the arms are located in the connectors.

The assembly of the valve and in particular the positioning of the rod and the ball are then simplified. In addition, making of these arms in the connectors rather than in the central body is easier and less expensive.

It is a further object of the invention the use of a valve comprising:
  a first conduit;
  a second conduit opposite the first conduit;
  a third conduit communicating with the first conduit and the second conduit;
  a shutter movable by the effect of a water pressure;
  elastically-deformable means adapted to hold the shutter in a rest position;
the shutter being movable between at least:
  the rest position in which the first conduit, the second conduit and the third conduit communicate with one another;
  a closure position in which the second conduit is shut off and in which the first conduit and the third conduit communicate with one another;
in a firefighting installation, including a network of sprinklers kept under vacuum in a standby position and flooded with water by an actuator if the installation is triggered in the event of a fire.

BRIEF DESCRIPTION OF THE DRAWINGS

Other features and advantages of the invention will appear more clearly on reading the following description of two preferred embodiments of the invention, provided as illustrative and non-limiting examples, and from the appended drawings among which:

FIG. 5 is a schematic perspective transparent view of one of the connectors of the valve of the installation according to the invention;

FIGS. 7 and 8 are schematic representations illustrating a valve provided with a hood according to a second embodiment of the invention, respectively according to a perspective view and according to a side transparent view.

DETAILED DESCRIPTION OF ILLUSTRATIVE EMBODIMENTS

Figure 1:
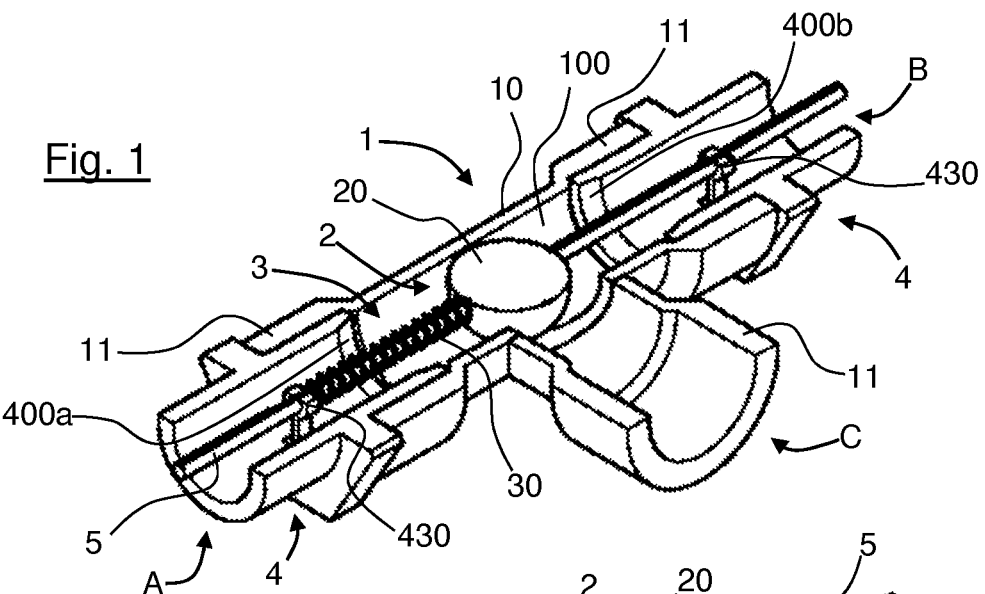
FIGS. 1 and 2 are schematic perspective representations according to a longitudinal sectional view of the valve of the installation according to the invention with the shutter respectively in its rest position and in its position of closure of the second conduit.
Figure 2:
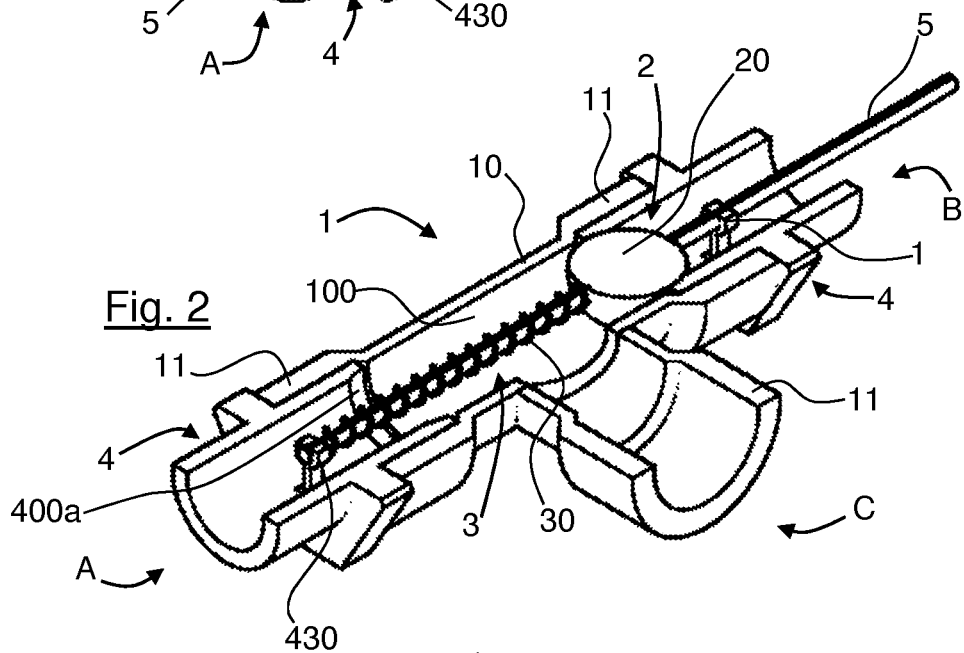
Figure 3:
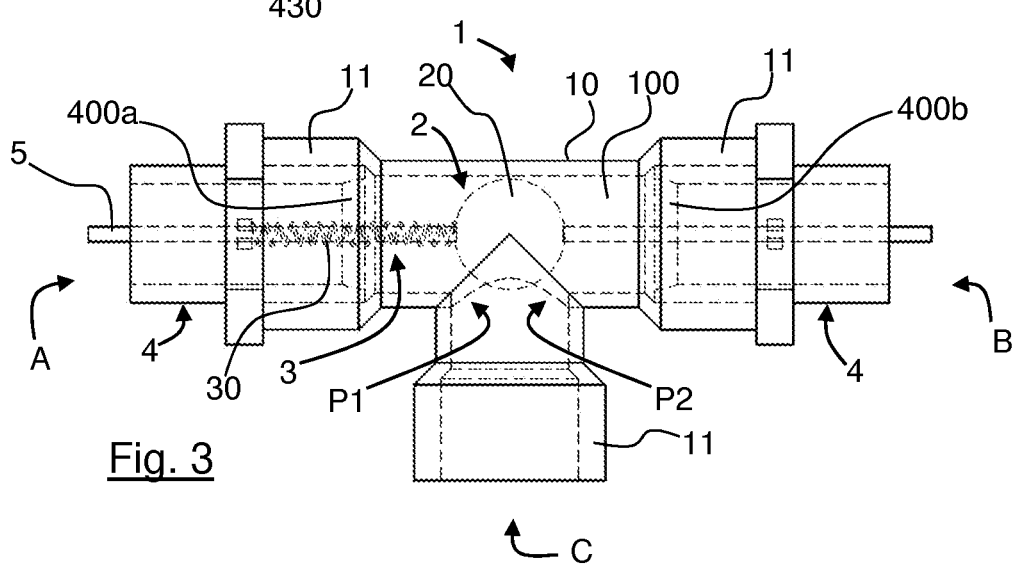
FIG. 3 is a schematic representation of the valve of the installation according to the invention in which the shutter is in its rest position.

Referring to FIGS. 1 to 3, the valve 1 according to the invention is designed to be integrated in a firefighting installation which comprises a network kept under vacuum in a standby position and flooded with water by an actuator if the installation is "triggered in the event of a fire". The invention also concerns the installation provided with such a valve 1, or with several ones of these valves 1.

In this installation, a control device is set so as to create an air intake in the network kept under vacuum as soon as a temperature is reached or exceeded. In this instance, this control device is a control sprinkler which comprises a fuse calibrated so as to burst starting from or when approaching a given temperature.

As soon as an actuator detects the air intake, it actuates a valve allowing supplying with water the network that is previously kept under vacuum in its standby position.

As illustrated in FIGS. 1 to 3, the valve 1 comprises:
a first conduit A;
a second conduit B opposite the first conduit A (in other words the first conduit A is aligned coaxially with the second conduit B);
a third conduit C.

All of the first conduit 1, the second conduit B and the third conduit communicate with one another via a central space 100 of the valve 1.

Figure 9:
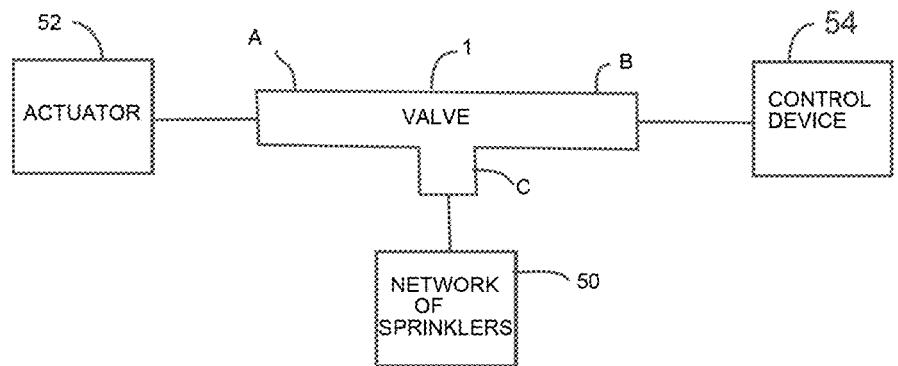
FIG. 9 is a block diagram illustrating a valve according to an exemplary embodiment connected to a network of sprinklers, an actuator and a control device.

FIG. 9 is a block diagram illustrating valve 1 connected to a network of sprinklers 50, an actuator 52 and a control device 54.

According to a particular embodiment, the conduits are arranged in a T-like fashion, the third conduit forming a substantially right angle with the first two conduits.

The first conduit A is intended to be coupled with the vacuum network which comprises the actuator (52 in FIG. 9).

The second conduit B is intended to be coupled with the control device (54 in FIG. 9) adapted to trigger the actuator by the effect of an air intake at the level of the control device.

The third conduit C is intended to be coupled to a sprinkling device (50 in FIG. 9) and communicates with the first conduit A and the second conduit B.

Still according to FIGS. 1 to 3, the valve 1 comprises in particular:
a central body 10;
two connectors 4 complementary to the central body 10 to form the first conduit A and the second conduit B.

The central body 10 is T-like shaped and has:
the central space 100;
three fittings 11.

The fittings 11 extend from the central body 10 while flaring. These fittings 11 allow connecting the central body 10 to other elements such as for example the connectors, a tubing, or a sprinkling device.

Two of the fittings 11 are opposite one another, and are in particular aligned coaxially with respect to the central space 100 of the central body 10 which has an essentially tubular shape. Each of these two fittings 11 are intended to receive one of the two connectors 4.

The assembly of the connectors 4 on the fittings 11 forms the first conduit A and the second conduit B.

According to the present embodiment, the connectors 4 are screwed on the central body 10.

To this end, the fittings 11 have threads and the two connectors 4 have tappings complementary to the threads.

The valve 1 also comprises a shutter 2 movable by the effect of a water pressure. This shutter 2 is movable between:
a rest position (FIG. 1) in which the first conduit A, the second conduit B and the third conduit C communicate with one another;
a closure position (FIG. 2) in which the second conduit B is shut off, and where the first conduit A and the third conduit C communicate with one another.

The shutter 2 is movable inside the central space 100 of the central body 10 of the valve 1.

Of course, the central space 100 is designed so that, in the rest position of the shutter 2, air and/or water could circulate proximate to and/or around the shutter so that the first conduit 1, the second conduit B and the third conduit C communicate with one another.

In this instance, as illustrated in FIG. 3, in the rest position of the shutter 2, the valve 1 has at least:
a first passage P1 between the first conduit A and the third conduit C;
a second passage P2 between the second conduit B and the third conduit C.

These passages P1, P2 are formed between the shutter 2 and the central body 10.

Referring to FIGS. 1 to 3, the second conduit B has an annular stop 400. The shutter 2 comes into annular contact against the annular stop 400 in its closure position so as to obtain a tight shutoff of the second conduit B.

This annular stop 400, described in more details later on, is formed in particular by a narrowing of the inner diameter of the second conduit and in particular a narrowing of the inner diameter with respect to that of the tubular-shaped central space 400 of the central body 10.

Referring to FIGS. 1 to 3, the first conduit A has an annular stop 400 identical to that of the second conduit B.

In other words, the first conduit A has a first annular stop 400a and the second conduit B has a second annular stop 400b, the first annular stop 400a being identical to the second annular stop 400b.

The valve 1 further comprises elastically-deformable means 3 adapted to hold the shutter 2 in its rest position.

These elastically-deformable means 3 are designed and assembled in the valve 1 so as to be able to hold, in the absence of external efforts, the shutter 2 in its rest position illustrated in FIG. 1.

In this instance, the elastically-deformable means comprise a spring 30.

To this end, the first conduit A and the second conduit B comprise means for receiving the spring 30.

These receiving means allow accommodating the spring 30 and provide it with a bearing point on a fixed portion of the valve 1.

The means for receiving the spring comprise, for each of the first conduit A and the second conduit B, at least one arm 43 extending inside said conduit.

This arm 43 serves as a bearing point for the spring 30. More specifically, one end of the spring 30 is coupled to the arm 43 whereas the other end of the spring 30 is coupled to the shutter 2.

In this instance, each conduit A, B comprises two arms 43 extending inside said conduit and meeting at the center of the conduit. The point where these two arms meet forms the bearing point of the spring 30.

These arms 43 are diametrically opposite to one another with respect to the center of the conduit.

As mentioned before and with reference to FIGS. 1 to 6, the valve 1 comprises connectors 4.

Figure 4:
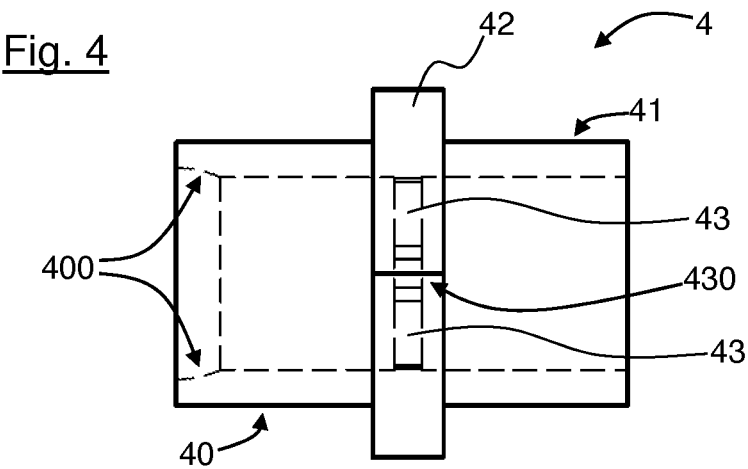
FIG. 4 is a schematic representation according to a side transparent view of one of the connectors of the valve of the installation according to the invention.
Figure 5:
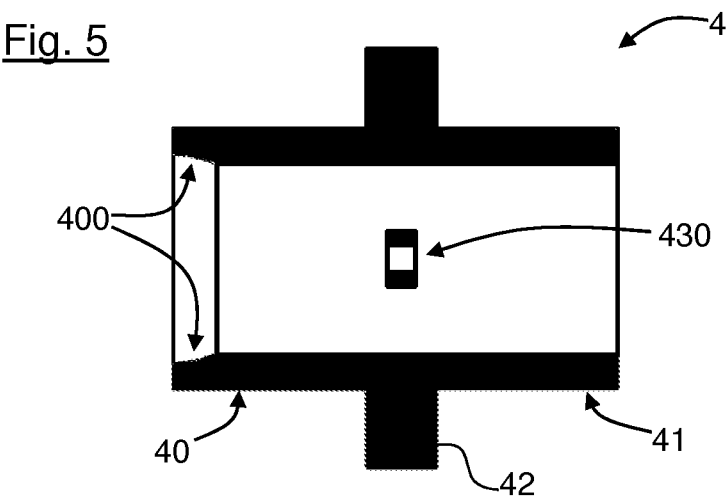
FIG. 5 is a schematic representation according to a side longitudinal sectional view of one of the connectors of the valve of the installation according to the invention.
Figure 6:
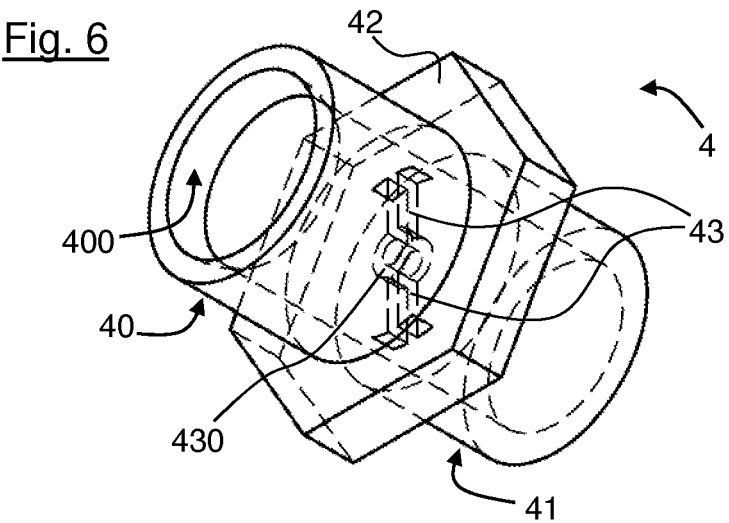

Referring to FIGS. 4, 5 and 6, the connectors 4 have an inner face delimiting a hollow cylinder opening on either side of each connector 4, and comprise:
- a first end 40 intended to be coupled to one of the fittings 11 of the central body 10;
- a second end 41 intended to be coupled to the network or to a device of the network;
- a hexagonal ring 42 located between the first end 40 and the second end 41.

The hexagonal ring 42 allows facilitating tightening of the connector 4 on the central body 10.

According to the present embodiment, the connectors 4 carry the annular stops 400. More specifically, the first end 40 of a connector 4 has an annular stop 400 located on the end of the inner face directly proximate to the central space 100 of the central body 10 when the connector 4 is assembled to said central body 10.

Still according to the present embodiment, the connectors 4 integrate the previously-described arms 43.

In other words, the arms 43 are located in the connectors 4.

In particular, the arms 43 are located setback from the annular stop 400 inside the connectors 4, and more specifically the arms 43 are positioned centrally inside the connectors 4.

Referring to FIGS. 1 to 3, the valve 1 is a ball valve. Indeed, the shutter 2 is a ball 20.

Complementarily, the annular stop 400 of the second conduit is shaped like a concave cap having a shape complementary to the ball 20 and with a hole in its center.

The cooperation of the ball 20 with such an annular stop 400 allows establishing a tight connection.

According to the present embodiment, the shutter 2 is fastened to a rod 5 slidably mounted inside the valve 1 according to an axis linking the first conduit A and the second conduit B. The rod 5 extends on either side of the shutter 2.

More specifically, the rod 5 comprises two sections with an identical size extending on each side of the ball 20.

The spring 30 of the elastically-deformable means 3 surrounds a portion of the rod 5.

As illustrated in FIGS. 1 to 6, the arms 43 of each connector 4 have a journal 430. These journals 430 are centered inside the conduits A, B.

The rod 5 is slidably mounted throughout the journals 430.

Preferably, the spring 30 is positioned in the first conduit A. More specifically, the spring 30 is coupled at one end to the ball 20 and at another end to the journal 430 presented by the connector 4 forming the first conduit A with the corresponding fitting 11 of the central body 10 of the valve 1.

The spring 30 is then designed so as not to enable the compression thereof and thus the shutoff of the first conduit A by the effect of drawing vacuum in the network.

Thus, the valve 1 does not enable neither shutoff of the first conduit A when drawing vacuum in the network nor vacuum drawing in the equipment located downstream of the second conduit B and the third conduit C.

The spring 30 is also designed so as to hold the ball 20 in its rest position, centered in the central body 10, as illustrated in FIGS. 2 and 3.

In the case where the network is flooded with water, a pressurized water stream then arrives in the valve 1 coming from the first conduit A. The spring 30 is dimensioned so as not to resist this pressure and enable water to move the ball 20 from its rest position to its position of closure of the second conduit B, as represented in FIG. 2.

The water stream and the pressure of water then hold the ball 20 in this position and water is totally directed towards the third conduit C.

According to a second embodiment illustrated in FIGS. 7 and 8, the valve 1 comprises a hood 6 coupled on the second conduit B. According to another embodiment, the hood 6 may be coupled on the first conduit A.

The hood 6 has a central opening 60 of the previously-described rod 5.

As illustrated in FIGS. 7 and 8, the valve 1 has in this embodiment in use:
- the central body 10 with a fitting 11 so as to form the second conduit B;
- a connector 4 coupled on the fitting 11 thereby forming the second conduit B, the connector 4 being screwed into the fitting 11 thanks to its hexagonal ring 42;
- the shutter 2 in the form of a ball 20 coupled to the rod 5 slidably mounted throughout the journal 430 carried by the connector 4.

In this configuration, the rod 5 projects from the second end 41 of the connector 4.

The hood 6 is then screwed on this second end 41 and the rod 5 then projects from the central opening 60 of the hood 6.

Thus, the valve 1 serves as a one-way valve.

The spring 30 is selected so as to be able to be at rest in a position where it shuts off the first conduit A, and in a position of clearing the first conduit A when it is pushed back by a water stream.

In this manner, the installer can use the valves 1 according to the invention to make multidirectional valves or one-way valves.

An example of application of the first embodiment of the valve 1 according to the invention, as illustrated in FIGS. 1 to 3, is described hereinafter.

On a main network (which is in a standby state, that is to say depressurized or "under vacuum"), the first conduit A of the valve 1 is connected while checking beforehand that the spring 30, inserted into the rod 6 carrying the ball 20, is properly installed on the first conduit A side (that is to say between the journal 430 of the connector 4 partially forming the first conduit A, and the ball). In this configuration, the compression of the spring 30 does not enable the ball 20 to bear on the annular stop 400 (also called "nozzle") of the first conduit A so as to avoid a complete shutoff of the orifice of the first conduit A when drawing vacuum in the network.

Thus, vacuum drawing is achieved in complete safety since a free space is maintained enabling the passage of air between the first conduit A, the second conduit B and the third conduit C.

The second conduit B and the third conduit C are fitted with two diffusers:
- the second conduit B is equipped with a sprinkler, called "control sprinkler" or else "detection sprinkler" provided with a large orifice closed by a fuse calibrated at 57° C. for example;
- the third conduit C is equipped with a water mist type diffuser (or sprayer) provided with a very narrow orifice and being closed by a fuse calibrated at 68° C.

Upon triggering of the control sprinkler (calibrated at 57° C.), the arrival of air in the vacuum network unbalances the pressure of the vacuum, which enables triggering of the actuator, thereby resulting in the arrival of water in the network.

Overwhelming of the network with water pushes the ball 20 in its position of closure of the second conduit B on which the control sprinkler is located. Thus, a water scattering is avoided and the extinction water is then diffused through the water mist type diffuser which, in principle, is triggered shortly after the control sprinkler as soon as its fuse breaks up at a temperature of 68° C.

A second example of application of the valve 1 according to the first embodiment, as well as according to the second embodiment, is described hereinafter.

The valve 1 can serve in a network designed to protect hydrocarbon tanks by cooling them in the event of a fire.

In this configuration, the network is installed in a crown-like shape at the periphery of the network. This crown serves for both detection and extinction and, of course, is in a vacuum state when in standby.

The detection function is ensured by the set-up of control sprinklers calibrated at substantially 68° C. on the crown, this set-up, being enabled by the addition of multidirectional valves 1.

The extinction function, ensured by open sprayers provided with a deluge head, is enabled by the addition of several one-way valves 1 according to the design of the crown.

On the main network, which is in a standby state under vacuum, the two-channel one-way valves are connected while checking beforehand that the spring on the rods of the ball are installed on the second conduit B, before the open sprayer, provided with a deluge head, installed on each valve 1.

In this configuration, the compression of the spring enables the ball 20 to bear on the annular stop 400 (also called nozzle) of the first conduit A to enable a tight shutoff of this conduit when drawing vacuum.

Upon triggering of one of the detection sprinklers, the arrival of air in the vacuum network unbalances the pressure of the vacuum, which enables triggering of the actuator and overwhelming of the network with water. This overwhelming with pressurized water pushes all balls 20 and at the same time results in:

- the switch of the one-way valves 1 provided with a control sprinkler into the position of closure of the conduit connected to the control sprinkler;
- the switch of the one-way valves 1 into an opening position to enable the diffusion of extinction water through all open sprayers, comprising a deluge head.

Although the present disclosure has been described with reference to one or more examples, workers skilled in the art will recognize that changes may be made in form and detail without departing from the scope of the disclosure and/or the appended claims.

The invention claimed is:

1. A firefighting installation comprising:
   a vacuum network of sprinklers kept under vacuum in a standby position and flooded with water by an actuator if the installation is triggered in an event of a fire; and
   at least one valve, comprising:
      a first conduit coupled with the vacuum network which comprises the actuator;
      a second conduit opposite the first conduit and coupled with a control device adapted to trigger the actuator by an effect of an air intake at a level of the control device;
      a third conduit coupled to a sprinkler of the network of sprinklers and communicating with the first conduit and the second conduit;
      a shutter movable by an effect of a water pressure; and
      an elastically-deformable element adapted to hold the shutter in a rest position;
      wherein the shutter is movable between at least:
         the rest position in which the first conduit, the second conduit and the third conduit communicate with one another; and
         a closure position in which the second conduit is shut off and in which the first conduit and the third conduit communicate with one another,
      wherein, in the rest position of the shutter, the valve has at least:
         a first passage between the first conduit and the third conduit;
         a second passage between the second conduit and the third conduit;
         the first passage and the second passage being formed between the shutter and a central body of the valve.

2. The firefighting installation according to claim 1, wherein the second conduit has an annular stop against which the shutter comes into annular contact in its closure position so as to obtain a tight shutoff of the second conduit.

3. The firefighting installation according to claim 2, wherein the first conduit has an annular stop identical to that of the second conduit.

4. The firefighting installation according to claim 3 wherein the valve comprises first and second connectors complementary to the central body to form the first conduit and the second conduit, and the first and second connectors have the annular stops.

5. The firefighting installation according to claim 2, wherein:
   the shutter is a ball; and
   the annular stop of the second conduit is shaped like a concave cap having a shape complementary to the ball and with a hole in its center.

6. The firefighting installation according to claim 1, wherein the elastically-deformable element comprises a spring, and each of the first conduit and the second conduit has a receiver for receiving the spring.

7. The firefighting installation according to claim 6, wherein the shutter is fastened to a rod slidably mounted inside the valve according to a direction linking the first conduit and the second conduit, the spring surrounding a portion of the rod.

8. The firefighting installation according to claim 7, wherein the receiver for receiving the spring comprises, for each of the first conduit and the second conduit, an arm extending inside said conduit, the arm having a journal throughout which the rod is sliding.

9. The firefighting installation according to claim 1, wherein the valve comprises first and second connectors complementary to the central body to form the first conduit and the second conduit.

10. A valve configured for use in a firefighting installation including a network of sprinklers kept under vacuum in a standby position and flooded with water by an actuator if the installation is triggered in an event of a fire, the valve comprising:
- a first conduit;
- a second conduit opposite the first conduit;
- a third conduit communicating with the first conduit and the second conduit;
- a shutter movable by an effect of a water pressure;
- an elastically-deformable element adapted to hold the shutter in a rest position;
- the shutter being movable between at least:
  - the rest position in which the first conduit, the second conduit and the third conduit communicate with one another; and
  - a closure position in which the second conduit is shut off and in which the first conduit and the third conduit communicate with one another;
- wherein, in the rest position of the shutter, the valve has at least:
  - a first passage between the first conduit and the third conduit;
  - a second passage between the second conduit and the third conduit;
  - the first passage and the second passage being formed between the shutter and a central body of the valve.

* * * * *